(12) United States Patent
Han

(10) Patent No.: US 9,869,689 B2
(45) Date of Patent: Jan. 16, 2018

(54) LASER DIODE BASED MULTIPLE-BEAM LASER SPOT IMAGING SYSTEM FOR CHARACTERIZATION OF VEHICLE DYNAMICS

(75) Inventor: Meng Han, Aachen (DE)

(73) Assignee: KONINKLIJKE PHILIPS ELECTRONICS N.V., Eindhoven (NL)

( * ) Notice: Subject to any disclaimer, the term of this patent is extended or adjusted under 35 U.S.C. 154(b) by 1465 days.

(21) Appl. No.: 13/318,153

(22) PCT Filed: Apr. 19, 2010

(86) PCT No.: PCT/IB2010/051687
§ 371 (c)(1),
(2), (4) Date: Oct. 31, 2011

(87) PCT Pub. No.: WO2010/125492
PCT Pub. Date: Nov. 4, 2010

(65) Prior Publication Data
US 2012/0044477 A1 Feb. 23, 2012

(30) Foreign Application Priority Data

Apr. 29, 2009 (EP) .................................... 09159068

(51) Int. Cl.
*G01P 3/36* (2006.01)
*B60T 8/172* (2006.01)
(Continued)

(52) U.S. Cl.
CPC .............. *G01P 3/366* (2013.01); *B60T 8/172* (2013.01); *B60W 40/11* (2013.01);
(Continued)

(58) Field of Classification Search
CPC ..... B60T 2250/04; B60T 8/172; B60W 40/11; B60W 40/112; B60W 40/114;
(Continued)

(56) References Cited

U.S. PATENT DOCUMENTS 3,604,804 A * 9/1971 Penney et al. .................. 356/28
4,470,696 A * 9/1984 Ballard ........................ 356/28.5
(Continued)

FOREIGN PATENT DOCUMENTS

GB 2184248 A 6/1987
JP 62235519 10/1987
(Continued)

OTHER PUBLICATIONS

Amoruso, Michael, "Euler Angles and Quaternions in Six Degree of Freedom simulations of Projectiles", Mar. 1996, p. 9.*
(Continued)

*Primary Examiner* — Assres H Woldemaryam

(57) ABSTRACT

The invention is related to a laser diode based multiple beam laser spot imaging system for characterization of vehicle dynamics. A laser diode based, preferably VCSEL based laser imaging system is utilized to characterize the vehicle dynamics. One or more laser beams are directed to the road surface. A compact imaging system including an imaging matrix sensor such as a CCD or CMOS camera measures locations or separations of individual laser spots. Loading status of vehicles and vehicles' pitch and roll angle can be characterized by analyzing the change of laser spot locations or separations.

20 Claims, 3 Drawing Sheets

(51) Int. Cl.
*B60W 40/11* (2012.01)
*B60W 40/112* (2012.01)
*B60W 40/114* (2012.01)
*G01P 21/02* (2006.01)
*G01S 7/48* (2006.01)
*G01S 17/06* (2006.01)
*G01S 17/58* (2006.01)

(52) U.S. Cl.
CPC ......... *B60W 40/112* (2013.01); *B60W 40/114* (2013.01); *G01P 21/02* (2013.01); *G01S 7/48* (2013.01); *G01S 17/06* (2013.01); *G01S 17/58* (2013.01); *B60T 2250/04* (2013.01)

(58) Field of Classification Search
CPC ............ G01P 3/366; G01P 21/02; G01S 7/48; G01S 17/06; G01S 17/58
USPC ................ 356/28, 28.5, 4.01–4.1, 5.01–5.15
See application file for complete search history.

(56) References Cited

U.S. PATENT DOCUMENTS

| | | | |
|---|---|---|---|
| 4,551,017 A * | 11/1985 | Mannava et al. | 356/28.5 |
| 5,040,116 A * | 8/1991 | Evans et al. | 701/28 |
| 5,164,823 A * | 11/1992 | Keeler | 348/31 |
| 5,227,859 A * | 7/1993 | Leib et al. | 356/457 |
| 5,745,152 A * | 4/1998 | Vincent et al. | 347/238 |
| 5,790,243 A * | 8/1998 | Herr | 356/5.1 |
| 5,963,248 A * | 10/1999 | Ohkawa et al. | 348/169 |
| 6,049,377 A | 4/2000 | Lau et al. | |
| 6,160,580 A * | 12/2000 | Nakashiba | H04N 3/1575 348/316 |
| 6,254,035 B1 * | 7/2001 | Howard et al. | 244/172.4 |
| 6,390,568 B1 * | 5/2002 | Tozu | B60T 8/4881 303/113.4 |
| 6,424,407 B1 * | 7/2002 | Kinrot et al. | 356/28 |
| 6,631,317 B2 | 10/2003 | Lu et al. | |
| 6,643,000 B2 * | 11/2003 | Fluckiger | 356/28 |
| 6,741,335 B2 * | 5/2004 | Kinrot et al. | 356/28 |
| 6,860,350 B2 | 3/2005 | Beuhler et al. | |
| 7,079,928 B2 * | 7/2006 | Lu | B60G 17/0162 280/735 |
| 7,372,395 B2 * | 5/2008 | Kojima et al. | 342/104 |
| 7,728,957 B2 | 6/2010 | Haase et al. | |
| 7,760,335 B2 | 7/2010 | Wolf et al. | |
| 8,035,624 B2 * | 10/2011 | Bell et al. | 345/175 |
| 8,269,191 B2 * | 9/2012 | Rosen et al. | 250/458.1 |
| 8,363,211 B2 * | 1/2013 | Groitzsch et al. | 356/5.01 |
| 2003/0142288 A1 * | 7/2003 | Kinrot et al. | 356/28 |
| 2004/0109155 A1 * | 6/2004 | Deines | 356/28.5 |
| 2007/0159381 A1 * | 7/2007 | Kojima et al. | 342/104 |
| 2008/0137062 A1 * | 6/2008 | Holton et al. | 356/28 |
| 2008/0204765 A1 * | 8/2008 | Hoffmann et al. | 356/606 |
| 2009/0213359 A1 * | 8/2009 | Fourcault et al. | 356/28 |
| 2011/0166744 A1 * | 7/2011 | Lu | B60T 8/1755 701/29.2 |

FOREIGN PATENT DOCUMENTS

| | | | | |
|---|---|---|---|---|
| JP | 01212384 | | 8/1989 | |
| JP | 07120554 A | | 5/1995 | |
| JP | H07120554 | * | 5/1995 | ............ G01S 17/58 |
| JP | 08210812 | | 8/1996 | |
| WO | WO 2007/042435 | * | 4/2007 | ............ G01S 17/58 |
| WO | 2009037278 A1 | | 3/2009 | |

OTHER PUBLICATIONS

Latoschik, Marc, "Augmenting a Laser Pointer with a Diffraction Grating for Monoscopic 6DOF Detection", 2006,.*
Description JPH07120554 Translation.*
Bosch et al., "A double-laser diode onboard sensor for velocity measurements", IEEE Transactions on instrumentation and measurement, Feb. 2004, pp. 95-101, vol. 53, No. 1.
G. Giuliani, et al. "Laser Diode Self-mixing Technique for Sensing Applications" in Journal of Pure and Applied Optics, 6 (2002), p. 283-294.
Complete Vehicle Testing Solutions, http://www.corrsys-datron.com/optical_sensors.htm, 2011, Corrsys-Datron.

* cited by examiner

LASER DIODE BASED MULTIPLE-BEAM LASER SPOT IMAGING SYSTEM FOR CHARACTERIZATION OF VEHICLE DYNAMICS

FIELD OF THE INVENTION

The invention generally concerns measurements of vehicle dynamics such as speed and roll angle. More specifically, the invention relates to optical measurements of vehicle dynamics.

BACKGROUND OF THE INVENTION

It is known that laser self-mixing interference (SMI) can be used for speed and distance measurements, see G. Giuliani, M. Norgia, S. Donati, T. Bosch "Laser Diode Self-mixing Technique for Sensing Applications" in Journal of Pure and Applied Optics, 6 (2002), page 283-294. It is also known that vertical cavity surface emitting laser (VCSEL) with integrated photodiode is particularly suitable for SMI sensing applications. However, a general problem with speed measurements using self-mixing sensors is that the orientation of the sensor with respect to the road directly influences the measurement. As the vehicle frequently changes its orientation with respect to the road, e.g., due to a declination of the vehicle body induced by centrifugal forces in a curve, measurement errors are induced. Thus, the absolute measurement accuracy of a self-mixing ground speed sensor is compromised by vehicle dynamics, namely, roll and pitch movement of vehicles.

OBJECT AND SUMMARY OF THE INVENTION

It is therefore an object of the invention to improve optical laser based vehicle dynamics sensors. This object is solved by the subject matter of the independent claims. Advantageous embodiments and refinements of the invention are defined in the dependent claims.

According to the invention, a laser diode based, preferably VCSEL based laser imaging system is utilized to characterize the vehicle dynamics. In the simplest case a single laser beam, preferably multiple laser beams are directed to the reference surface, i.e. the road surface. A compact imaging system including an imaging matrix sensor such as a CCD or CMOS camera measures locations, separations or distances of individual laser spots. Loading status of vehicles and vehicles' pitch and roll angle can be characterized by analyzing the change of laser spot locations or separations.

In combination with a laser self-mixing ground speed sensor, the multiple-beam laser spot imaging system according to the invention can significantly improve the absolute accuracy of vehicles' ground speed measurement. Pitch and roll angles derived from the laser imaging system can be implemented in a rotation matrix to correct the systematic error of the ground speed measurement.

In combination with a laser self-mixing ground speed sensor, the inventive multiple-spot laser imaging system improves the reliability of vehicles' ground speed measurement. The laser output power, focus quality of the beams, contaminations to sensor exit windows and road surface reflectance can be continuously analyzed by monitoring the contrast ratio of the beam spots on the road. Abnormal changes indicate laser failure, out-of-focus sensing beam, severe contaminations to sensor exit or entrance window or presence of extremely low reflectance roads.

Since typical wavelength of near-infrared VCSEL (e.g of 0.86 nm) is within the spectral response range of conventional CCD or CMOS camera, preferably either a low cost CCD or CMOS camera is employed as the sensing component of the multi-spot laser imaging system.

In particular, an optical vehicle laser sensor system for detection of vehicle dynamics parameters is provided, comprising
  a laser device which generates at least one laser beam, so that the laser beam generates a laser spot on a reference surface placed opposite to the laser device,
  an imaging device comprising at least one matrix sensor with a lens for imaging the laser spot onto the reference surface, the imaging device being arranged so that the laser spot onto the reference surface is visible within a field of view of the imaging device, whereby the optical axis, resp. the viewing direction of the imaging device and the direction of said laser beam are non-coincident,
  a detector for detecting a velocity of the optical vehicle laser sensor system relatively to the reference surface from the signal of the laser beam reflected or scattered back from the reference surface,
  a data processing device for detecting the laser spot location within the image data retrieved from the imaging device, and calculating the orientation of said optical vehicle laser sensor system from the spot location.

As the viewing direction or optical axis of the imaging device and the direction of the laser beam are non-coincident, the laser spot location within the image taken by the camera is dependent on both the distance of the laser device to the reference surface and the polar angle of the laser device with respect to the perpendicular of the reference surface. It is in this regard advantageous to emit the laser beam under an angle with respect to the viewing direction. Compared to a laser beam spatially separated but parallel to the viewing direction, an angle of the beam to the viewing direction causes a greater displacement of the laser spot in the image as a function of vertical displacement of the laser device.

The sensitivity of the determination of the orientation can be considerably enhanced and ambigiuities in the measurement can be eliminated if more than one, in particular at least three spatially separated laser beams are employed.

Thus, according to a preferred refinement of the invention, the laser device generates three spatially separated laser beams, so that the three laser beams produce three laser spots on the reference surface, wherein two pairs of the spots are separated along two different lateral directions along the reference surface.

In particular, lateral distances between the laser spots may be determined and the orientation of the optical vehicle laser sensor system with respect to the reference surface may be calculated on the basis of the lateral distances.

The spatial separation of the laser spots along two non-coincident directions allow to measure the changes of mutual distances of the spots along these directions and thus provide information about a tilt in arbitrary direction.

In case of a road vehicle such as a car, a motor cycle, a truck or a bus, the road surface may advantageously used as the reference surface. The orientation determined by the data processing device may include the roll angle and the pitch angle of a vehicle on which the sensor system is mounted. The roll angle is the angle of rotation of the vehicle around the forward or heading direction. The pitch angle is the angle of rotation around an axis vertically to the driving direction and parallel to the reference surface, or road surface.

It is not necessary to calculate these angles in terms of degrees. Rather, numbers may be calculated which represent these angles. Accordingly, instead of the angles, parameters equivalent thereto may be determined by the data processing device. Preferably, all of these angles, or equivalent parameters, respectively, are determined to provide detailed information on the vehicle dynamics. Furthermore, also the slip angle (also referred to as the yaw angle) may be determined. This angle is the angle of rotation around an axis vertically to the road surface, or reference surface, respectively. This angle can be derived from a comparison of the forward and lateral velocities determined from the measurement of the self-mixing oscillation frequencies.

Similarly to the embodiment using a single laser beam, the variation of the distances of the laser spots can be advantageously enhanced, if at least one of the laser beams impinges onto the reference surface under an angle with respect to the reference surface normal. It is therefore advantageous, if at least two of the three laser beams are emitted under different angles so that these beams are non-parallel.

There are various detection principles for the detection of the velocity with respect to the reference surface. For example, the detection may be based on a time-of-flight measurement. Preferably, however, the detection is based on measurement of self-mixing laser power oscillations. If a part of the laser light scattered or reflected back along the optical path into the cavity, the coherent superposition of the back-reflected light and the light generated in the cavity causes intensity oscillations. A particular accurate measurement employing this principle can be performed using Doppler velocimetry.

For this purpose, the single laser beam or at least one of a multitude of laser beams has a direction with a component along the velocity direction. This can be easily fulfilled by using a beam whose direction includes an angle to the perpendicular of the reference surface. The Doppler effect then introduces a time varying phase shift to the reflected laser beam. If the velocity is constant, this phase shift results in periodically varying laser intensity. The frequency of this oscillation is directly proportional to the velocity. Thus, according to a refinement of the invention, the detector for detecting a velocity of the optical vehicle laser sensor system relatively to the reference surface comprises a detector for detecting a self-mixing laser intensity oscillation and circuitry for determining the frequency or period of the oscillation.

The laser intensity may be measured using a monitor photodiode as a detector. It is also feasible to measure variations in the voltage across the laser cavity or the laser current, respectively.

The beams may be generated by splitting a laser beam. However, it is preferred to use three laser diodes, one for each beam. Inter alia, this is advantageous to separate components of movement using self-mixing Doppler velocimetry, since the self-mixing oscillations can be determined for each beam separately.

Further, a preferred type of laser diodes are vertical cavity surface emitting laser diodes (VCSELs). These types of laser diodes generally produce beams having better defined beam profiles compared to edge emitting laser diodes. Furthermore, VCSELs can be easily produced as laser diode arrays on a single chip without considerably increasing the production costs with respect to a single laser diode. Thus, according to a refinement of the invention, the laser device comprises a chip with three VCSEL mesas thereon. As the inventive device employs multiple beams, such an array of VCSEL laser diodes is particularly suitable for the laser device.

Furthermore, it is advantageous to employ near infrared emitting laser diodes, i.e. laser diodes emitting at a wavelength of at least 800 Nanometer. Although typical near-infrared VCSEL laser light of a wavelength around 0.86 nm is invisible to human eyes, it can nevertheless be easily detected by conventional CCD and CMOS cameras, whose spectral response range reaches up to 1 nm. When the beam is directed onto the road surface, the individual laser spots can be easily imaged with strong contrast even at presence of high ambient light. Thus, according to a refinement of the invention, the laser device generates laser beams having wavelengths between 800 and 1000 Nanometers.

In combination with the speed sensor, or detector for detecting a velocity, respectively, both the accuracy and reliability of vehicle's ground speed measurement can be greatly improved. Once vehicles' pitch and roll angles are known from the inventive multi-spot laser imaging system, systematic errors of the speed sensor induced by vehicle dynamics can be corrected accordingly.

Thus, according to a refinement of the invention, the data processing device is set up to calculate a pitch angle, and a roll angle and to correct a velocity measured by the detector based on the pitch angle and roll angle.

The slip angle may be determined by comparison of the forward and lateral velocity and can be corrected on the basis of the determined roll and pitch angles.

If the laser beams include an angle, not only the absolute position of the spots within the acquired image but also their mutual distances vary with the distance of the laser device to the reference surface. In this case, the distance of the laser device to the reference surface can thus be calculated by the data processing device from the separation or mutual distance of the spots. As the spot position changes as well, the distance to the road surface may also be determined from the location of a laser spot.

Furthermore, failure of laser diodes, contaminations to an exit window of the sensor, out-of-focus sensing beam and presence of low reflectance road can be revealed by monitoring the changes of the contrast ratio of individual VCSEL focal spots.

The accuracy of the system can be further considerably enhanced if the optical vehicle laser sensor system comprises a second or further laser device laterally offset to the first laser device. If there is a specific forward direction, such as the forward driving direction of a vehicle, it is in this regard furthermore advantageous if the laser devices are spaced apart both along this forward direction and transversally to the forward direction. It is preferred to provide separate image sensors or cameras for both laser devices so that the cameras can be placed near the reference surface. The measurement of the distance of the laser device to the reference surface is particularly sensitive. As in case of both a roll angle and a pitch angle, the distances of the laser devices to the reference surface vary, these angles can be calculated by the data processing device from the measured distances.

Generally, the lasers are sufficiently intense to provide sufficient contrast in the recorded images so as to unambiguously detect the laser spot locations. However, the contrast can be further improved by suppressing the background light. According to one embodiment, a preferably narrow bandpass filter which transmits the laser light is arranged upstream to the matrix sensor to block background light. Preferably, the maximum transmission of the filter is chosen to be at or near the laser wavelength.

According to a further alternative or additional embodiment, the laser diode is operated in a pulsed mode (e.g. square wave), temporally synchronized imaging further improves the contrast ratio of the laser spots. In particular, a pulsed power supply for the laser device is provided for pulsing the laser beams. The imaging device is synchronized with the pulsed power supply so that images are acquired during a pulse and between two pulses. To suppress the background signal, the data processing unit can simply subtract the images.

DETAILED DESCRIPTION OF EMBODIMENTS

The optical vehicle laser sensor system for detection of vehicle dynamics parameters according to the invention is based on a laser device which generates three spatially separated laser beams directed onto the road surface, so that three laterally separated laser spots on the road surface are produced. An imaging device with a matrix sensor images the laser spots. The speed of the vehicle is determined from Doppler-induced self-mixing laser intensity oscillations. The laser sensor system further comprises a data processing device for calculating lateral distances between the imaged laser spots, and determining the orientation of the optical vehicle laser sensor system with respect to the road surface, or the vehicle's orientation with respect to the road, respectively.

Figure 1:
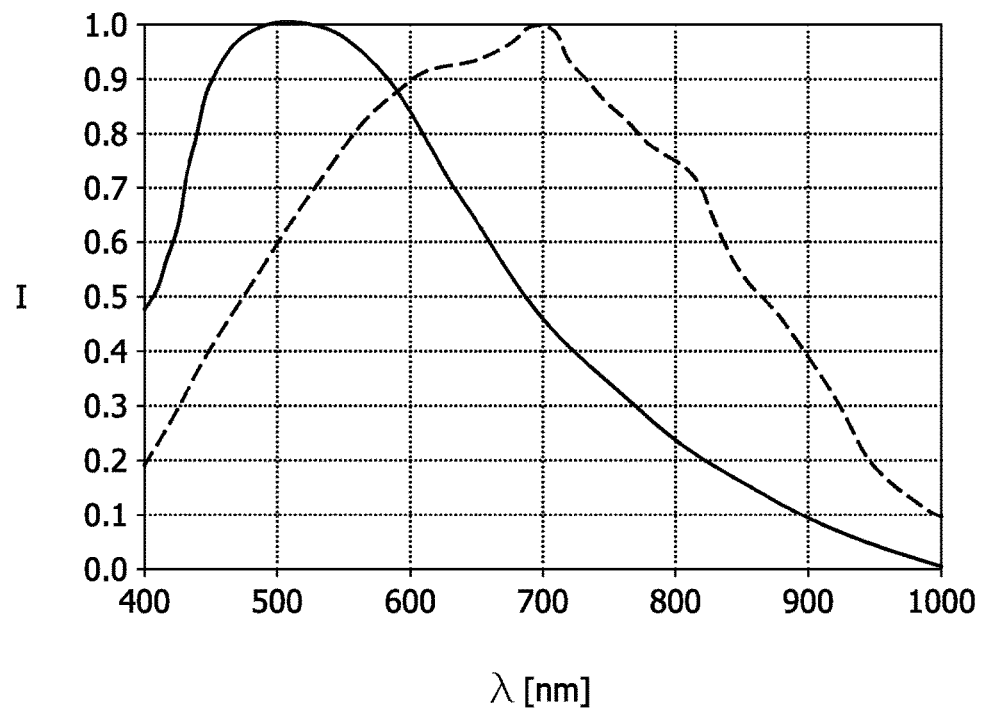
FIG. 1 shows spectral response curves of a CCD-camera and a CMOS camera.

A VCSEL emitting in the infrared spectral region between 800 and 1000 nanometers wavelength is particularly preferred as laser diode. Although VCSEL beams of self-mixing ground speed sensors are in this case invisible for human eyes, they can nevertheless be readily imaged with conventional CCD or CMOS camera, as can be seen in FIG. 1. The dotted line shows the spectral response of a CMOS sensor and the continuous line is the spectral response of a CCD sensor. As indicated in FIG. 1, typical wavelength of a near-infrared VCSEL (for example: 0.86 µm, indicated by the dashed vertical line) is within the spectral response ranges of both CCD and CMOS sensors.

Figure 2:
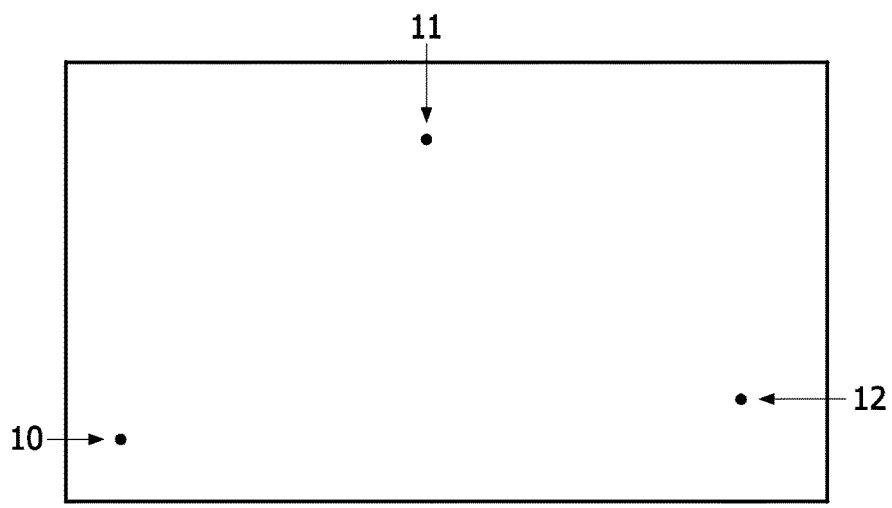
FIG. 2 shows an image of the laser spots on the road surface.

Assuming as an exemplary embodiment that all VCSELs of the laser device are focused at the road surface with a numerical aperture of about 0.02, the radius of VCSEL focus at road surface is about 26 nm. An optical power of only 1 mW from a typical VCSEL can produce a power density at road surface of 4.7 MW/m². In contrast, maximum irradiation of full sun is only 1 kW/m². Thus, even at presence of high ambient light, brightness of VCSEL focus spot is at least three orders of magnitude higher than that of background. Therefore, the VCSEL focus spots can be visualized with very high contrast even with low cost CCD or CMOS cameras, which is verified in FIG. 2, showing a color inverted image of the three laser spots 10, 11, 12 on the road taken with a low-cost matrix-camera.

Figure 3:
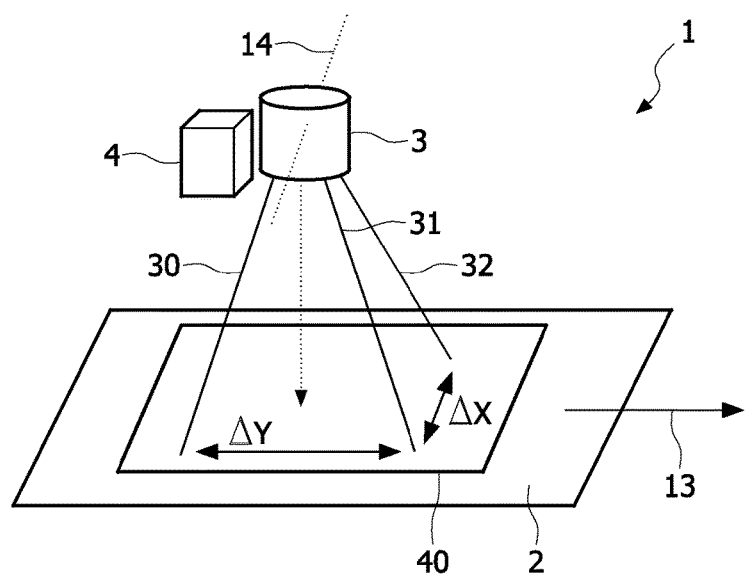
FIG. 3 illustrates an embodiment of an optical vehicle laser sensor system.

FIG. 3 shows a first embodiment of an optical vehicle laser sensor system 1. The laser device 3 is mounted on a vehicle at a distance Z above the road surface 2. The laser device emits three laterally separated laser beams 30, 31, 32. The laser beams are emitted non-parallel so that an angle is included both between beams 30, 31 and beams 31, 32. Due to these angles, not only the imaged spot positions but also their mutual distances vary if the laser device is tilted with respect to the road surface 2 or displaced vertically thereto along direction Z.

Furthermore, as the laser beams hit the road surface 2 under an oblique angle, Doppler induced phase shifts for a movement in lateral direction along the road surface are induced into the reflected light so that the laser intensity of the laser diodes can be evaluated to extract self-mixing oscillations and determine the vehicle velocity therefrom.

A camera 4 is placed nearby the laser beams 30, 31, 32 so that the laser spots on the road surface 2 lie within the camera's field of view 40.

If for example, the vehicle tilts about its main heading direction or forward direction 13, the distance ΔY between the spots of beams 31 and 32 will change. The angle of rotation about this direction is referred to as the roll angle θ. On the other hand, a tilt of the vehicle body about an axis 14 extending vertical to direction 13 and parallel to the road surface 2 alters the position and mutual lateral distance of the spots of laser beams 30 and 31. The angle of rotation about this axis 14 is referred to as the pitch angle.

If the distance of the laser device to the road surface 2 decreases, the mutual distances between all spots will decrease as well, and vice versa. Thus, the distance to the road can be calculated from the mutual distances ΔX and ΔY of the laser spots as well.

Figure 4:
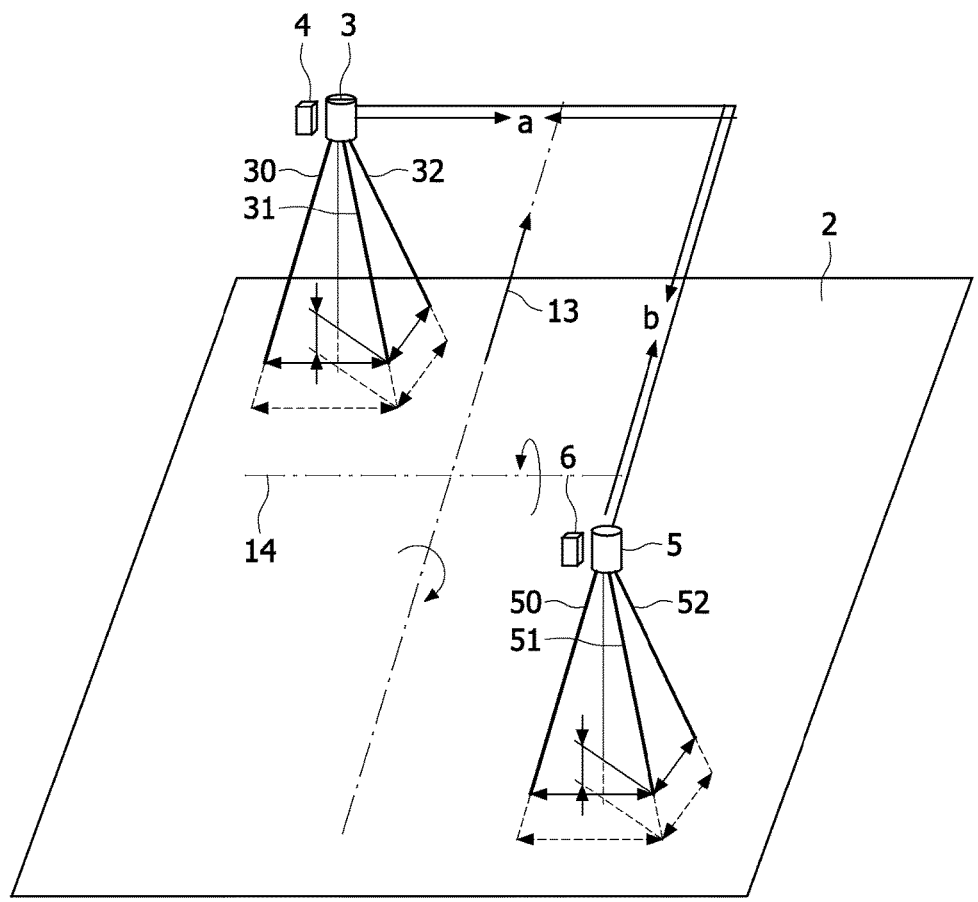
FIG. 4 depicts a further embodiment with two spatially separated laser devices.

The configuration of a further embodiment of an optical vehicle laser sensor system is illustrated in FIG. 4. According to this embodiment, a first laser device 3 and a second laser device 5 are employed, which are arranged laterally offset at two different positions on the vehicle. Separate cameras 4, 6 are provided for each laser device 3, 5. Specifically, the laser devices 3 and 5 are spaced apart both along the forward direction 13 by a distance b and transversally thereto along axis 14 by a distance a.

The VCSEL focus spot separations ΔX between laser beams 30, 31 and 50, 51 are proportional to the height of the respective laser devices 3, 5 relative to the road surface 2:

$$\frac{\Delta X_0}{\Delta X'} = \frac{Z_0}{Z_0 + \Delta Z}$$

where $Z_0$ and $\Delta X_0$ denote the mounting height of VCSELs in a static, non-loaded vehicle and the corresponding VCSEL focus spot separations at the road surface, respectively. Actual laser spot separations at presence of vehicle dynamics are denoted as $\Delta X'_1$ and $\Delta X'_2$. Change of height of laser devices 3, 5, induced either by pitch/roll and/or loading is denoted as $\Delta Z_1$, $\Delta Z_2$. Considering a typical 4.5 m long vehicle with a chassis height of 15 cm ($Z_0$), a pitch angle of 1 degree can produce a change of height ΔZ of 4 cm, which corresponds to 26% relative change in ΔX. Therefore, a low cost CCD or CMOS camera with less than 20000 Pixel, such as, e.g., only 10 K pixel will be sufficient for many applications.

Figure 6:
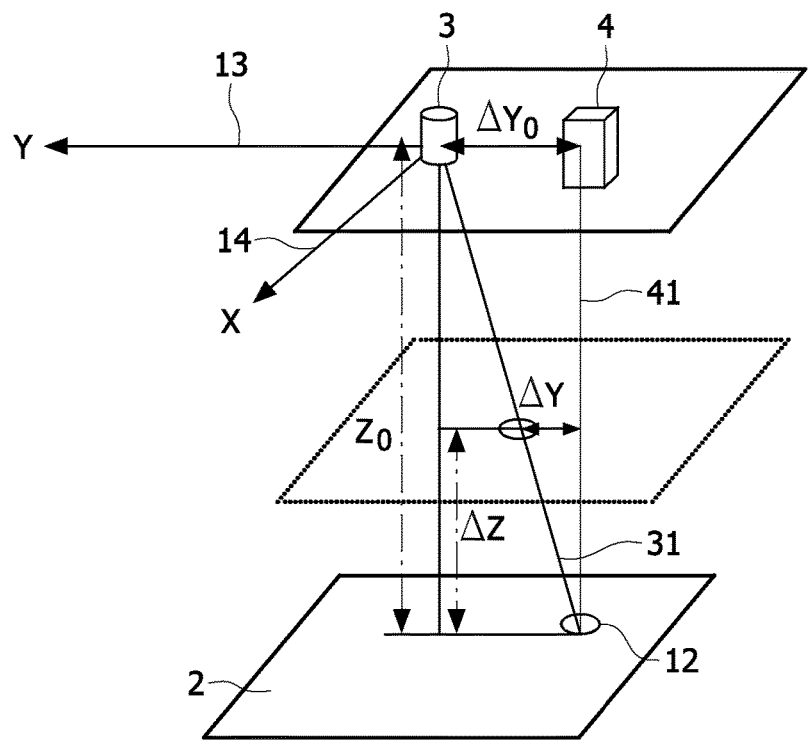
FIG. 6 shows a further embodiment of an optical vehicle laser sensor system.

As shown in another embodiment in FIG. 6, change of vehicle height $\Delta Z$ can also be derived from the laser spot location which is captured by a CMOS or CCD camera 4.

The laser beam impinges to the road surface under an oblique angle with respect to the road surface normal. This causes a shift of the location of laser spot 12 in dependence of a height shift $\Delta Z$, which can be expressed by:

$$\frac{\Delta Y}{\Delta Y_0} = \frac{\Delta Z}{Z_0}$$

In this relation, $\Delta Y_0$ denotes the separation between a laser ground speed sensor 3 and a camera system 4. $\Delta Y$ indicates the distance between laser spot 12 and the central optical axis 41 of camera 4. For simplicity, the laser beam of sensor 3 which is mounted in an unloaded, static vehicle is focused at road surface and crosses the central optical axis of camera 4. Accordingly, vehicle dynamics parameter can already be obtained by monitoring a single laser beam. If the laser beam also has a component in x-direction.

Of course, the monitoring of laser spot position shifts in addition or alternative to a relative measurement of their mutual distance can be applied to a multi-beam device as shown in FIGS. 3 and 4 as well. Furthermore, a shift in position is even observed in case that laser beam 30 and optical axis of the camera 4 are non-coincident but parallel. This is due to the fact that the magnification factor of the camera depends on the distance.

With an arrangement using two laser devices 3, 5 as shown in FIG. 4, the vehicles' pitch ($\psi$) and roll ($\theta$) angles can be derived from change of VCSEL mounting height ($\Delta Z$) at the different positions of the laser devices:

$$\theta = \frac{\Delta Z_1 - \Delta Z_2}{a}$$

$$\psi = \frac{\Delta Z_1 - \Delta Z_2}{b}$$

Thus, instead of utilizing inertial or angular sensor to characterize vehicle dynamics, the multi-beam laser imaging system provides an effective alternative to monitor vehicles' pitch/roll movement and loading conditions. Particularly, in combination with a laser ground speed sensor, the accuracy and reliability of vehicle's ground speed and slip angle measurement can be significantly improved, as is elucidated in more detail in the following. For the purpose to improve accuracy of ground speed and slip angle measurement, the data processing device calculates the pitch angle and roll angle, as explained above and then corrects the velocities (i.e. the values of the velocity vector) measured by the detector based on the calculated pitch angle and roll angle.

The vehicle's ground speed or velocity vector $V_0=(Vx, Vy, Vz)$ is derived from the Doppler frequency vector ($f_1, f_2, f_3$), e.g., measured by a photodiode which is integrated to each VCSEL. The frequencies $f_1, f_2, f_3$ are the frequencies of the self-mixing oscillations of the respective laser intensities. The relation of the frequencies $f_1, f_2, f_3$ and the velocities Vx, Vy, Vz (i.e. the cartesian components of the velocity vector) is given by:

$$\begin{pmatrix} f_1 \\ f_2 \\ f_3 \end{pmatrix} = \frac{2}{\lambda} \begin{pmatrix} \sin\theta_1\cos\varphi_1 & \sin\theta_1\sin\varphi_1 & \cos\theta_1 \\ \sin\theta_2\cos\varphi_2 & \sin\theta_2\sin\varphi_2 & \cos\theta_2 \\ \sin\theta_3\cos\varphi_3 & \sin\theta_3\sin\varphi_3 & \cos\theta_3 \end{pmatrix} \begin{pmatrix} V_x \\ V_y \\ V_z \end{pmatrix}$$

Figure 5:
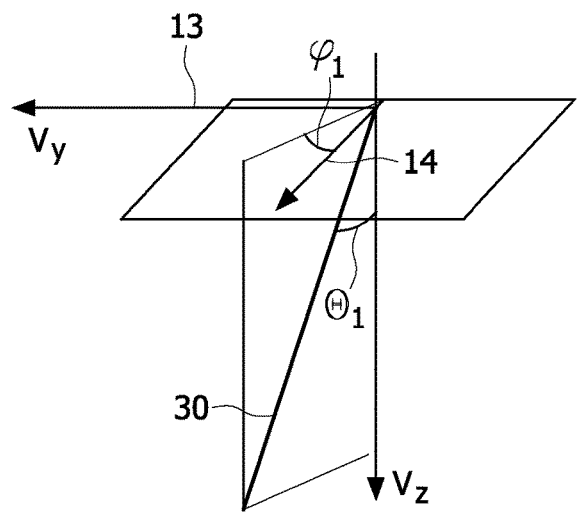
FIG. 5 shows the orientation of a laser beam.

In this matrix equation, the angles $\theta_1, \theta_2, \theta_3$, denote the polar angles of the three laser beams measured with respect to the perpendicular of the road surface. The angles $\varphi_1, \varphi_2, \varphi_3$, denote the azimuthal angles of the beams measured with respect to direction 14 perpendicular to the forward direction 13. The orientation of these angles with respect to the forward direction 13 and direction 14 is shown in FIG. 5 for one of the laser beams (i.e beam 30).

At presence of vehicle dynamics, the measured speed vector $V=(V_x, V_y, V_z)$ can be corrected with a rotation matrix $M_R$ in order to derive the true vehicle ground speed $V_0=(V_{x0}, V_{y0}, V_{z0})$ according to the equation $V_0 = M_R^{-1} V$, where $M_R$ is a matrix:

$$M_R =$$

$$\begin{pmatrix} \cos\theta\cos\phi & \sin\psi\sin\theta\cos\phi + \cos\psi\sin\phi & -\cos\psi\sin\theta\cos\phi + \sin\psi\sin\phi \\ -\cos\theta\sin\phi & -\sin\psi\sin\theta\sin\phi + \cos\psi\cos\phi & \cos\psi\sin\theta\sin\phi + \sin\psi\cos\phi \\ \sin\theta & -\cos\theta\sin\psi & \cos\theta\cos\psi \end{pmatrix}$$

Accordingly, to obtain the corrected vector $V_0$, the measured vector is multiplied with the inverse of the matrix $M_R$. In the above equations, $\theta$ denotes the roll angle and $\Psi$ the pitch angle. $\varphi$ denotes the angle between the reference orientation of the laser device, or its forward direction, respectively, and vehicle's forward direction. This angle may, e.g., occur due to mounting inaccuracies of the laser device.

The angle $\varphi$ may be determined in a calibration procedure. In particular, if multiple beams are used and a determination of the transversal or lateral speed can be obtained from the self-mixing signals of the respective laser diodes, the angle $\varphi$ can be obtained from the remaining lateral speed if the vehicle is moving straight ahead. In this case, the angle $\varphi$ can be calculated according to the relation $\varphi=\arctan(V_x/V_y)$, wherein $V_y$ denotes the forward speed and $V_x$ the transversal speed in a dynamic state without transversal acceleration.

Besides ground speed, the body slip angle of a vehicle is another critical parameter relevant to vehicle dynamics control. The relationship between measured ($\beta$) and real ($\beta_0$) vehicle's body slip angle can be approximated by the data processing device according to following equation:

$$\beta = \frac{\cos\theta\beta_0 + \sin\theta\sin\psi - \cos\psi\sin\theta\left(\frac{V_{z0}}{V_{y0}}\right)}{\cos\psi}$$

Again, $\theta$ denotes the roll angle, $\Psi$ denotes the pitch angle and. $\varphi$ denotes the angle between the reference orientation of the laser device, or its forward direction, respectively, and vehicle's forward direction. $V_{z0}$ and $V_{y0}$ denote the corrected vertical and forward velocities. These velocities may be corrected according to the above matrix equation. The body slip angle is the angle between the vehicle's actual heading (or forward) direction and its longitudinal axis. This angle is measured similarly to angle $\varphi$ according to the relation $\beta=\arctan(V_x/V_y)$, wherein $V_y$ denotes the forward speed and $V_x$ the transversal speed. In difference to angle (I), the body slip angle typically occurs during a transversal acceleration, e.g. while driving a turn, while angle $\varphi$ occurs due to a misalignment of the laser device and the vehicle's longitudinal axis. Thus, according to a refinement of the invention, the measured body slip angle, e.g. measured by comparison of the forward and lateral velocities is corrected using the above equation.

Once the pitch and roll angles are known from the multi-spot laser imaging system, systematic errors of SMI ground speed sensor can be corrected with the rotation matrix $M_R$. Thus, the absolute measurement accuracy of ground speed and slip angle can be greatly improved.

Besides accuracy improvement, the optical vehicle laser sensor system can improve the reliability of a ground speed sensor. Output power of individual VCSEL, focus quality of each sensing beam and reflectance of road surface are continuously analyzed by measuring the brightness or contrast ratio of each VCSEL focal spots.

An abnormal reduction in contrast ratio may indicate VCSEL failure, out-of-focus sensing beam, severe contaminations to a sensor exit window or presence of very low reflectance road surface. An early detection of such events is particularly advantageous for an optical sensor (e.g. SMI ground speed sensor) which can be used for vehicle stability control and is exposed directly to the harsh environment.

Without requiring conventional inertial or angular sensor, VCSEL based multiple-beam laser spot imaging system is able to measure vehicles' roll, pitch angle and loading status. The system can be used for vehicle dynamics control, headlamp automatic leveling and advanced suspension systems. Particularly, in combination with a multi-beam self-mixing ground speed sensor, both the accuracy and the reliability of vehicles' ground speed and slip angle measurements can be greatly improved.

The invention claimed is:

1. An optical vehicle laser sensor system, comprising:
a laser device which is configured to generate at least one laser beam, so that said laser beam is directed along a direction toward a reference surface disposed opposite to the laser device to produce a laser spot on the reference surface,
an imaging device comprising at least one matrix sensor with a lens, wherein the imaging device is configured to image said laser spot, wherein said imaging device has an optical axis and is arranged so that said laser spot on said reference surface is visible within a field of view of said imaging device, wherein the optical axis of said imaging device and the direction of said laser beam are non-coincident with each other,
a detector which is configured to detect a velocity of said optical vehicle laser sensor system relative to said reference surface from a signal of said laser beam which is reflected or scattered back from said reference surface, and
a data processing device which is configured to detect a laser spot location within image data retrieved from said imaging device, and to calculate an orientation of said optical vehicle laser sensor system from the laser spot location.

2. The optical vehicle laser sensor system of claim 1, wherein said laser device is configured to generate three spatially separated laser beams, so that the three spatially separated laser beams generate three laser spots on the reference surface placed opposite to the laser device, wherein two pairs of the laser spots are separated along two different lateral directions along the reference surface.

3. The optical vehicle laser sensor system of claim 2, wherein said data processing device is configured to determine lateral distances between the laser spots, and to determine the orientation of said optical vehicle laser sensor system with respect to said reference surface based on said lateral distances.

4. The optical vehicle laser sensor system of claim 3, wherein the data processing device calculates a distance of the laser device to the reference surface from the location of one of the laser spots, or from the distances between the laser spots.

5. The optical vehicle laser sensor system of claim 2, wherein at least two of the three laser beams are directed to the reference surface under different angles than each other with respect to the reference surface.

6. The optical vehicle laser sensor system of claim 1, wherein the detector for detecting the velocity of the optical vehicle laser sensor system relative to the reference surface comprises:
a detection device for detecting a self-mixing laser intensity oscillation; and
circuitry for determining a frequency or period of the oscillation.

7. The optical vehicle laser sensor system of claim 2, wherein said laser device comprises three laser diodes, each generating one of said three laser beams.

8. The optical vehicle laser sensor system of claim 1, wherein said laser device comprises three vertical cavity surface emitting laser diodes.

9. The optical vehicle laser sensor system of claim 1, further comprising a second laser device laterally offset to the laser device, wherein the laser device and second laser device are spaced apart from each other both along a forward direction and transversally to said forward direction.

10. The optical vehicle laser sensor system of claim 9, wherein said data processing device is configured to determine a first distance of the laser device to said reference surface, and to determine a second distance of the further laser device to said reference surface, and to calculate from said first and second distances a roll angle and a pitch angle of the optical vehicle laser sensor system.

11. The optical vehicle laser sensor system of claim 1, wherein said data processing device is configured to calculate at least one of a pitch angle and a roll angle of the optical vehicle laser sensor system, and to correct a velocity of the optical vehicle laser sensor system measured by said detector based on said pitch angle and roll angle.

12. The optical vehicle laser sensor system of claim 11, wherein said velocity of the optical vehicle laser sensor system is corrected by said data processing device by calculating $V_0 = M_R^{-1} V$, wherein $V_0 = (V_{x0}, V_{y0}, V_{z0})$ denotes the corrected velocity vector and $V = (V_x, V_y, V_z)$ denotes the measured velocity vector, and wherein $M_R^{-1}$ is the inverse of matrix:

$$M_R = \begin{pmatrix} \cos\theta\cos\phi & \sin\psi\sin\theta\cos\phi + \cos\psi\sin\varphi & -\cos\psi\sin\theta\cos\phi + \sin\psi\sin\varphi \\ -\cos\theta\sin\phi & -\sin\psi\sin\theta\sin\phi + \cos\psi\cos\varphi & \cos\psi\sin\theta\sin\phi + \sin\psi\cos\varphi \\ \sin\theta & -\cos\theta\sin\psi & \cos\theta\cos\psi \end{pmatrix}$$

wherein θ denotes the roll angle of the optical vehicle laser sensor system, ψ the pitch angle of the optical vehicle laser sensor system, and Φ denotes an angle between a forward direction of said laser device and a forward direction of the optical vehicle laser sensor system.

13. The optical vehicle laser sensor system of claim 1, further comprising a pulsed power supply for the laser device, wherein said imaging device is synchronized with said pulsed power supply so that images are acquired during a pulse and between two pulses, and wherein said data processing unit subtracts said images acquired during a pulse and between two pulses.

14. The optical vehicle laser sensor system of claim 1, wherein the at least one matrix sensor comprises one of a charge-coupled device and a complementary metal oxide semiconductor sensor.

15. The optical vehicle laser sensor system of claim 2, wherein the orientation of the optical vehicle laser sensor system includes a pitch angle of the optical vehicle laser sensor system and a roll angle of the optical vehicle laser sensor system,
wherein the imaging device is configured to image the three laser spots on the reference surface, and
wherein the data processing device is configured to calculate the based on the three imaged laser spots, and to correct a velocity measured by the detector based on the orientation of the optical vehicle laser sensor system includes.

16. The optical vehicle laser sensor system of claim 1, wherein the velocity includes a forward velocity of the optical vehicle laser sensor system relative to the reference surface and a lateral velocity of the optical vehicle laser sensor system relative to the reference surface, and wherein the detector is configured to detect the forward velocity of the optical vehicle laser system and the lateral velocity of the optical vehicle laser system from the signal of said laser beam reflected or scattered back from said reference surface.

17. The optical vehicle laser sensor system of claim 16, wherein the orientation of the optical vehicle laser sensor system includes include a slip angle of the optical vehicle laser sensor system, and wherein the data processing device is configured to calculate the slip angle of the optical vehicle laser sensor system from the forward velocity of the optical vehicle laser system and the lateral velocity of the optical vehicle laser system.

18. A system, comprising:
a laser device configured to be mounted on a vehicle and disposed above a road surface, wherein the laser device is configured to generate at least three laser beams and to direct each of the three laser beams onto the road surface to produce three laser spots on the road surface, wherein at least two of the three laser beams are non-parallel with each other and at least one of the three laser beams impinges obliquely on the road surface;
an imaging device, comprising at least one matrix sensor configured to image the three laser spots on the road surface, the imaging device being arranged such that the three laser spots on the road surface are visible within a field of view of the imaging device;
a detector configured to detect a velocity of the vehicle relative to the road surface from a signal of at least one of the laser beams reflected or scattered back from the road surface, and
a data processing device configured to calculate values of vehicle dynamics parameters based on locations of the three imaged laser spots on the matrix sensor, wherein the vehicle dynamics parameters are dependent on a pitch angle of the vehicle and a roll angle of the vehicle, the data processing device being further configured to correct the velocity detected by the detector based on the vehicle dynamics parameters which are dependent on the pitch angle and roll angle.

19. The system of claim 18, wherein the velocity includes a forward velocity of the vehicle and a lateral velocity of the vehicle, and wherein the detector is configured to detect the forward velocity of the vehicle relative to the road surface and the lateral velocity of the vehicle relative to the road surface from the signal of the at least one of the laser beams reflected or scattered back from the road surface.

20. The system of claim 19, wherein the vehicle dynamics parameters include a skip angle of the vehicle, and wherein the data processing device is configured to calculate the skip angle from the forward velocity of the vehicle and the lateral velocity of the vehicle.

* * * * *